United States Patent [19]

Püntener et al.

[11] Patent Number: 4,507,125

[45] Date of Patent: Mar. 26, 1985

[54] USE OF 1:2 CHROME COMPLEX DYES FOR DYEING LEATHER AND FURS

[75] Inventors: Alois Püntener, Rheinfelden; Josef Koller, Reinach, both of Switzerland

[73] Assignee: Ciba-Geigy Corporation, Ardsley, N.Y.

[21] Appl. No.: 545,554

[22] Filed: Oct. 26, 1983

[30] Foreign Application Priority Data

Nov. 2, 1982 [CH] Switzerland ................... 6366/82

[51] Int. Cl.³ .................... C09B 45/16; D06P 3/30
[52] U.S. Cl. ........................... 8/437; 8/641; 8/684; 8/686
[58] Field of Search ............ 8/437, 641, 684, 686

[56] References Cited

U.S. PATENT DOCUMENTS

| 3,185,676 | 5/1965 | Klein | 260/145 A |
|---|---|---|---|
| 4,425,133 | 1/1984 | Puntener | 8/437 |
| 4,427,411 | 1/1984 | Puntener | 8/404 |

FOREIGN PATENT DOCUMENTS

| 55808 | 7/1982 | European Pat. Off. . |
| 61998 | 10/1982 | European Pat. Off. . |
| 61670 | 10/1982 | European Pat. Off. . |
| 92923 | 11/1983 | European Pat. Off. . |
| 95441 | 11/1983 | European Pat. Off. . |
| 2918633 | 11/1980 | Fed. Rep. of Germany . |
| 3023664 | 1/1982 | Fed. Rep. of Germany . |
| 1220724 | 5/1960 | France . |
| 1564749 | 4/1980 | United Kingdom . |

*Primary Examiner*—A. Lionel Clingman
*Attorney, Agent, or Firm*—Edward McC. Roberts

[57] ABSTRACT

The dyes of the formula I given in claim 1 are suitable for dyeing furs and especially leather.

They are preferably used in admixture with one or more suitable yellow, blue or red dyes for dyeing leather in dark shades.

10 Claims, No Drawings

USE OF 1:2 CHROME COMPLEX DYES FOR DYEING LEATHER AND FURS

The invention relates to the use of 1:2 chrome complex dyes of the formula I

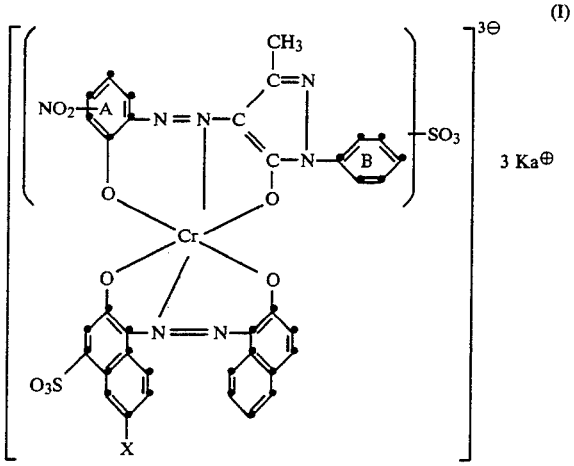

wherein X is hydrogen, chlorine or nitro, and wherein the sulfo group in the pyrazolone dye is arranged in the ring A or B, and the nitro group is arranged in the ring A of this dye in the 4-, 5- or 6-position of the 1-hydroxy-2-aminobenzene, for dyeing leather or furs.

$Ka^\oplus$ is a cation, for example an alkali cation, such as lithium, potassium or preferably sodium. $Ka^\oplus$ can also be an ammonium cation or the ammonium salt of an organic amine.

The nitro group in the ring A is preferably arranged in the 4- or 6-position, particularly in the 4-position.

The sulfo group in the pyrazolone dye is arranged in the ring B in the 2-, 3- or 4-position; preferably however it is in the ring A and in this ring especially in the 6-position.

X is preferably nitro.

The particularly preferred dye of the formula I is that wherein X is nitro, and the nitro group in the ring A is arranged in the 4-position, and the sulfo group in this ring in the 6-position.

The dyes of the formula I are produced in the customary manner by way of the 1:1 chrome complex of one of the azo dyes.

The 1:2 chrome complexes are used for dyeing furs or preferably leather, all types of leather being suitable, for example chrome leather, re-tanned leather or suède leather of the goat, cow or pig. These dyes are distinguished in particular by high colouring strength on leather.

Dull brown dyeings having very good fastness properties, especially fastness to light and to wet processing, are obtained.

The preferred use of the dyes of the invention is for the dyeing of leather with dye mixtures in dark shades, especially in admixture with one or more suitable yellow, blue or red 1:2 metal-complex dyes, with which mixtures virtually all darker shades can be obtained on leather with a relatively small amount of dye. These mixtures render possible tone-in-tone dyeings on various types of leather.

There are preferably used dye mixtures containing:

(a) a brown 1:2 chrome complex dye of the formula I given in the foregoing; as well as (b) at least one of the following dyes:

($\alpha$) an orange, red or red-brown dye of the formula II

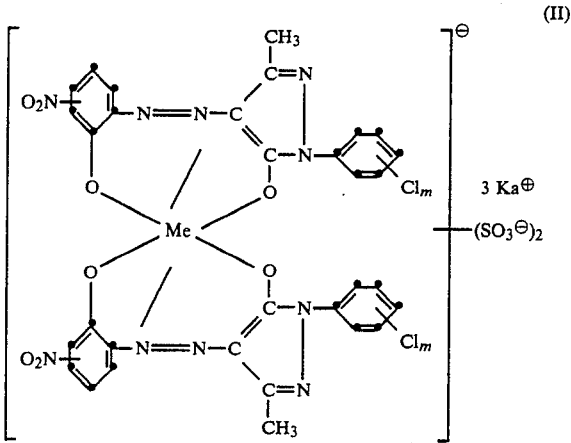

wherein m is an integer from 0 to 2, Me is cobalt or chromium, and $Ka^\oplus$ is a cation, ($\beta$) a blue or violet dye of the formula III

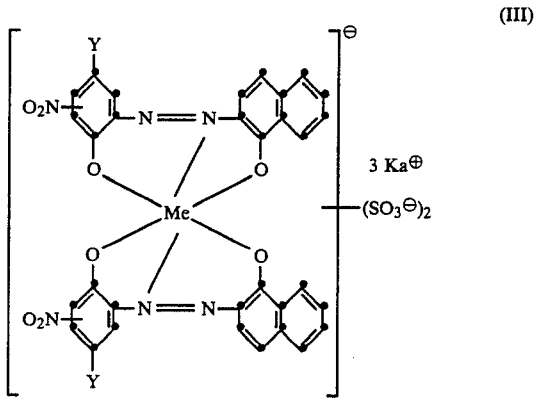

wherein

Y is hydrogen, chlorine, methyl or methoxy,

Me is cobalt or chromium, and $Ka^\oplus$ is a cation, or of the formula IV

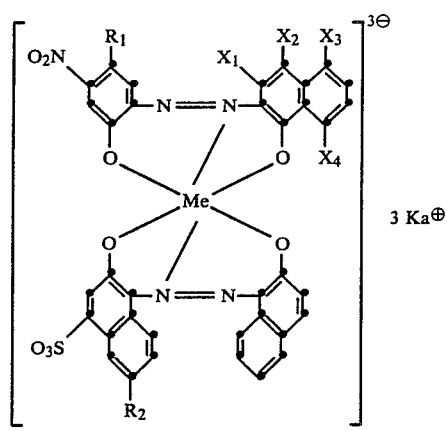

wherein

Me is cobalt or chromium,

R₁ is hydrogen, chlorine, methyl or methoxy,

R₂ is hydrogen or chlorine, and

Ka⊕ is a cation, and of the substituents

X₁, X₂, X₃ and X₄, one is an SO₃ group, and the other three are hydrogen, or (γ) a yellow or yellow-brown dye of the formula V

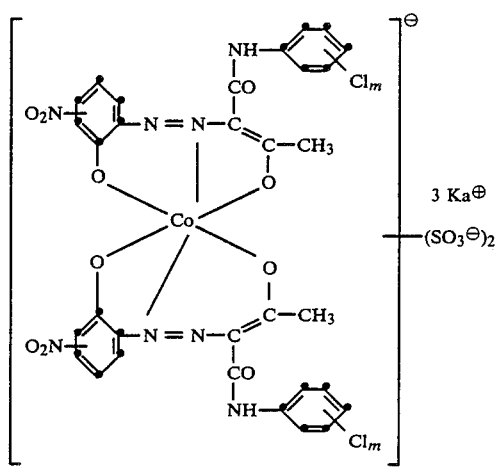

wherein m is an integer from 0 to 2, and Ka⊕ is a cation; and (c) optionally a yellow dye of the formula VI

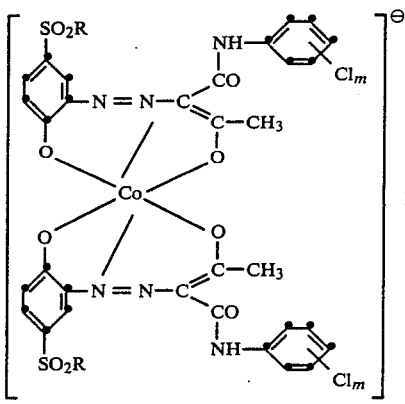

wherein

R is $C_1-C_4$-alkyl, amino, $C_1-C_4$-alkylamino or $C_1-C_4$-dialkylamino, and m is 0 or 1.

Particularly preferred is the use of a dye mixture containing:

(a) a brown dye of the formula I, (b) a yellow or yellow-brown dye of the formula V, and (c) a yellow dye of the formula VI.

The following Examples serve to further illustrate the invention without its scope being limited by them. 'Parts' are parts by weight, and percentages are percent by weight.

EXAMPLE 1

100 parts of garment suède leather are wetted back for 2 hours at 50° C. in a solution of 1000 parts of water and 2 parts of 24% ammonia; and the material is subsequently dyed for 1 hour at 60° C. in a solution of 1000 parts of water, 2 parts of 24% ammonia and 3 parts of the dye of the formula

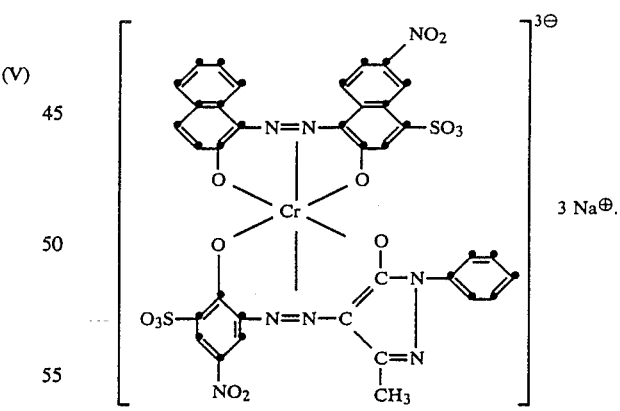

There is then added a solution of 40 parts of water and 4 parts of 85% formic acid, and dyeing is continued for a further 30 minutes. The leather is afterwards well rinsed, and optionally treated with 2 parts of a dicyanodiaminoformaldehyde condensation product for 30 minutes at 50° C. A brown dyeing having excellent fastness properties is obtained.

The employed dye was produced in the following manner:

Into 1000 parts of water are introduced successively the complex 1:1 chrome compound, which contains 41.9 parts of the dye formed from diazotised 4-nitro-2-aminophenol-6-sulfonic acid and 1-phenyl-3-methyl-5-pyrazolone as well as 5.2 parts of chromium, and 43.9 parts of the monoazo dye formed from 2-naphthol-1-diazo-6-nitro-4-sulfonic acid and 2-naphthol, and at pH 5–9 the mixture is heated at 80° C. until the reaction of the 1:2 complex is finished. The dye is subsequently precipitated with 200 parts of sodium chloride, filtered and then dried.

EXAMPLE 2

When the procedure is carried out in the manner described in Example 1 except that the following 1:2 chrome-complex dye is used, there is obtained on leather a brown dyeing having good fastness properties.

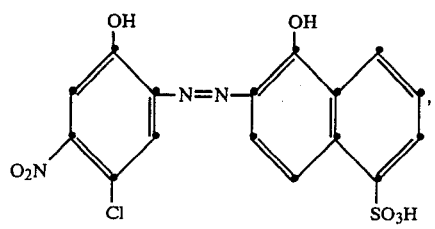

The employed dye was produced in the following manner:

The 1:1 chrome complex containing 41.9 parts of the dye formed from diazotised 4-nitro-2-aminophenol and 1-(phenyl-4'-sulfonic acid)-3-methyl-5-pyrazolone as well as 5.2 parts of chromium is introduced into 950 parts of water and 50 parts of triethanolamine, and there are then added 43.9 parts of the monoazo dye formed from 2-naphthol-1-diazo-6-nitro-4-sulfonic acid and 2-naphthol. At a pH value of 5–9, the reaction mixture is heated at 80° C. until the 1:2 complex has been completely formed. The dye is afterwards precipitated with 200 parts of potassium chloride, filtered and then dried.

EXAMPLE 3

When the procedure is carried out in the manner described in Example 1 except that there is used, in place of the dye employed therein, a dye mixture consisting of:

0.55 part of the dye given in Example 1,
0.33 part of the yellow 1:2 cobalt complex of the monoazo dye of the formula

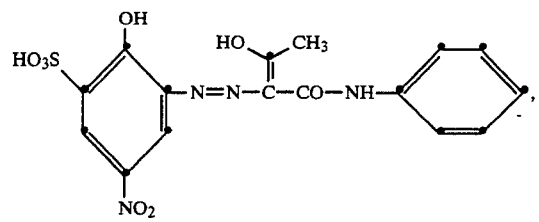

as well as 0.11 part of the blue 1:2 chrome complex of the monoazo dye of the formula

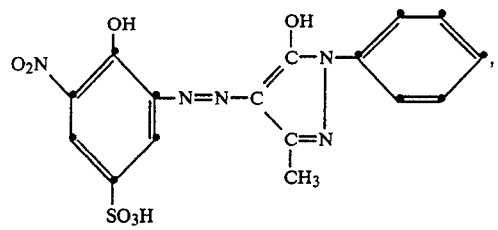

there is obtained leather dyed in an olive-brown shade having good fastness properties. The dyeing is distinguished by a particularly high colouring strength.

EXAMPLE 4

By carrying out the procedure as in Example 1 but using, instead of the dye employed therein, a dye mixture consisting of:

0.60 part of the dye given in Example 1,
0.10 part of the yellow dye given in Example 3, and
0.05 part of the red 1:2 chrome complex of the dye of the formula

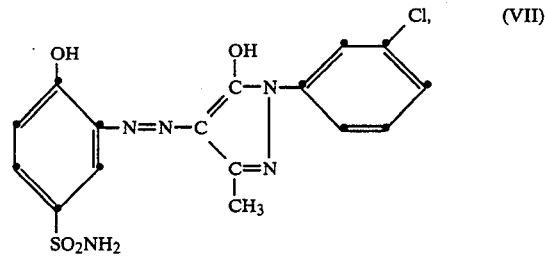

there is obtained on leather a reddish-brown dyeing having good fastness properties. The dyeing is distinguished by a particularly high colouring strength.

EXAMPLE 5

When the procedure is carried out as in Example 1 except that there is used, in place of the dye employed therein, a dye mixture consisting of:

0.40 part of the dye given in Example 1,
0.10 part of the yellow 1:2 cobalt complex used in Example 3, and
0.15 part of the yellow dye of the formula (VII)

1:2 cobalt complex the result is a yellowish-brown dyeing on leather having good fastness properties. The dyeing is distinguished by a particularly high colouring strength.

EXAMPLE 6

By carrying out the procedure as in Example 5 but using, in place of the yellow dye of the formula (VII) employed therein, the yellow dye of the formula

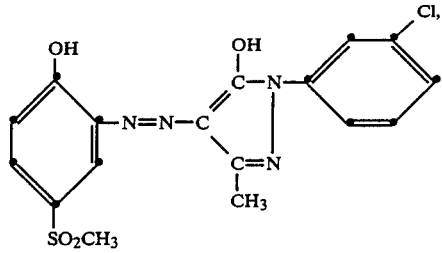

1:2 cobalt complex there is obtained on leather a yellowish-brown dyeing having good fastness properties. The dyeing is distinguished by a particularly high colouring strength.

EXAMPLE 7

When the procedure is carried out as in Example 1 except that there is used, in place of the dye employed therein, a dye mixture consisting of 0.4 part of the dye used in Example 1 and 0.1 part of the yellow 1:2 cobalt complex used in Example 3, there is obtained on leather a yellowish-brown dyeing having good fastness properties. The dyeing is distinguished by a particularly high colouring strength.

What is claimed is:

1. A process for dyeing leather or furs, comprising the step of applying thereto a 1:2 chrome complex dye of the formula

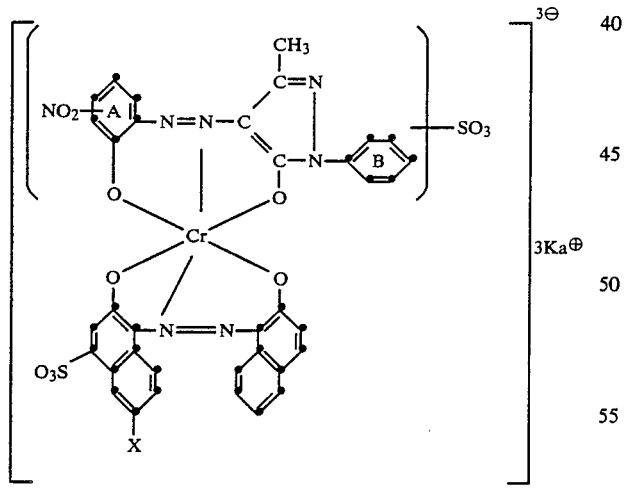

wherein X is chlorine or nitro, and wherein the sulfo group in the pyrazolone dye is in ring A or B, and the nitro group is in ring A at the 4-, 5- or 6-position of the 1-hydroxy-2-aminobenzene.

2. The process of claim 1 wherein the nitro group in ring A is in the 4- or 6-position.

3. The process of claim 1 wherein the sulfo group in the pyrazolone dye is in ring A.

4. The process of claim 1 wherein X is nitro.

5. The process of claim 3 wherein X is nitro, the nitro group in ring A is in the 4-position, and the sulfo group in ring A is in the 6-position.

6. The process of claim 1, wherein the substrate is leather.

7. The process of claim 1, wherein the 1:2 chrome complex dye is brown and is part of a dye mixture which further contains (a) at least one of the following dyes:

(i) an orange, red or red-brown dye of the formula

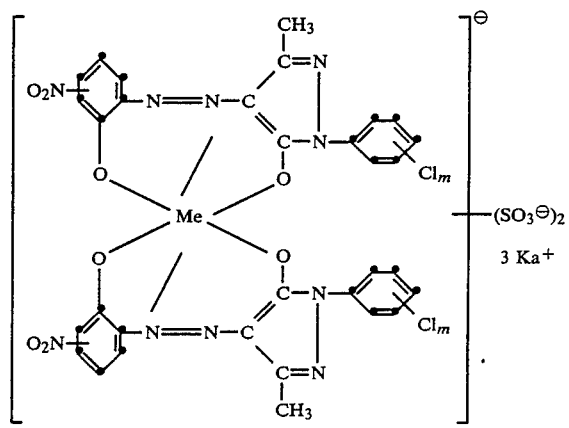

wherein m is an integer from 0 to 2,

Me is cobalt or chromium, and $Ka^{\oplus}$ is a cation, (ii) a blue or violet dye of the formula

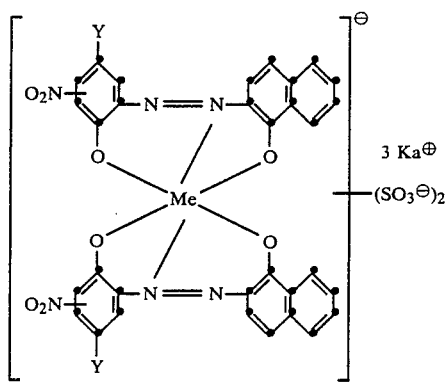

wherein

Y is hydrogen, chlorine, methyl or methoxy,

Me is cobalt or chromium, and $Ka^{\oplus}$ is a cation, or of the formula

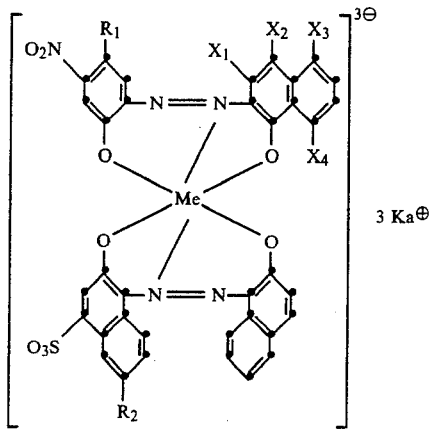

wherein

Me is cobalt or chromium, $R_1$ is hydrogen, chlorine, methyl or methoxy, $R_2$ is hydrogen or chlorine, and $Ka^{\oplus}$ is a cation, and of the substituents $X_1$, $X_2$, $X_3$ and $X_4$, one is an $SO_3$ group, and the other three are hydrogen, and (iii) a yellow or yellow-brown dye of the formula

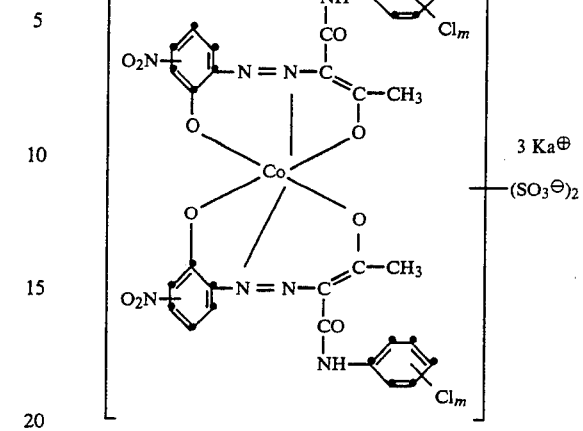

wherein
m is an integer from 0 to 2, and
$Ka^{\alpha}$ is a cation; and (b) optionally a yellow dye of the formula

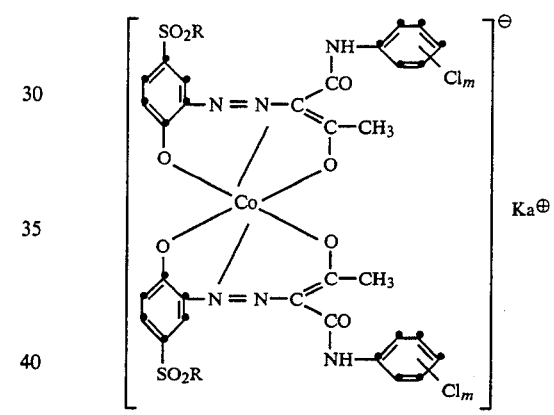

wherein
R is $C_1$-$C_4$-alkyl, amino, $C_1$-$C_4$-alkylamino or $C_1$-$C_4$-dialkylamino, and m is 0 or 1.

8. The process of claim 7, wherein the dye mixture contains, in addition to the brown dye, the yellow or yellow-brown dye (a, iii) and the optional yellow dye (b).

9. The process of claim 2, wherein the nitro group in Ring A is in the 4-position.

10. The process of claim 3, wherein the sulfo group in the pyrazolone dye is in the 6-position of Ring A.

* * * * *